March 27, 1928.
E. W. DUNBAR
1,663,587
PROCESS OF MANUFACTURING RUBBER ARTICLES
Filed March 17, 1926    2 Sheets-Sheet 2
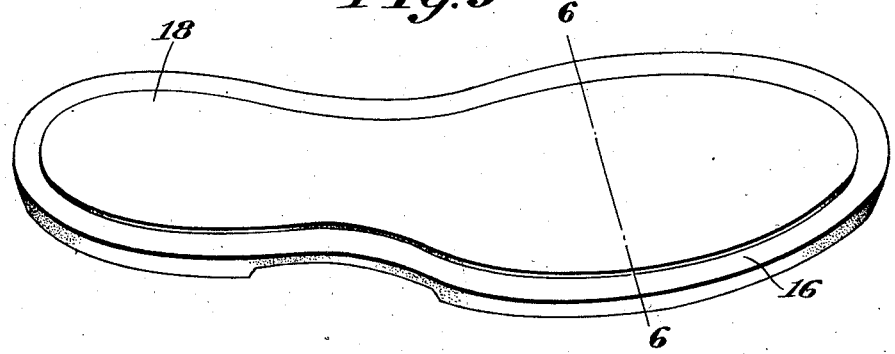
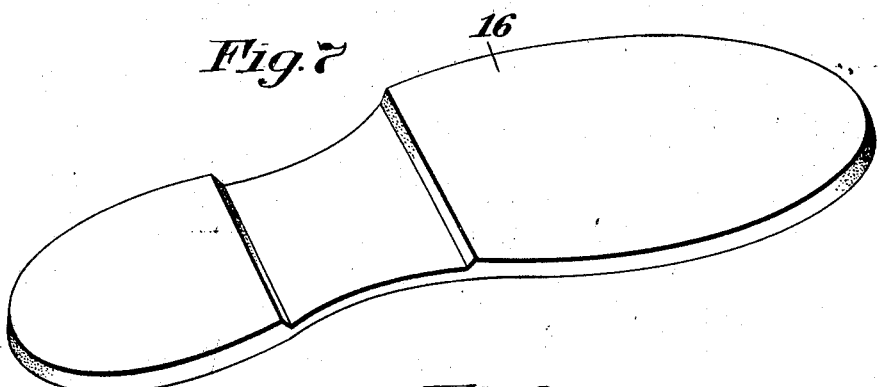
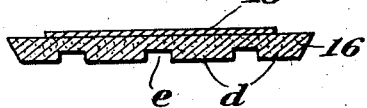
INVENTOR.
Ernest W. Dunbar
BY
J. H. McCready
his ATTORNEY.

Patented Mar. 27, 1928.

1,663,587

UNITED STATES PATENT OFFICE.

ERNEST W. DUNBAR, OF HUDSON, MASSACHUSETTS, ASSIGNOR TO CAMBRIDGE RUBBER CO., OF CAMBRIDGE, MASSACHUSETTS, A CORPORATION OF MASSACHUSETTS.

PROCESS OF MANUFACTURING RUBBER ARTICLES.

Application filed March 17, 1926. Serial No. 95,264.

This invention relates to the manufacture of molded rubber articles, and will be herein disclosed in connection with the manufacture of rubber outsoles for footwear.

It is a common practice to provide the outsole of a rubber shoe of any description with a roughened or corrugated surface designed to prevent slipping. These roughened surfaces are usually produced in the operation of calendering, and this procedure is quite satisfactory so long as a relatively shallow impression only is desired. In some kinds of footwear, however, as for example, in basketball and sport shoes, the design on the tread face of the sole involves relatively prominent projections or deep grooves or recesses, and these designs cannot be produced satisfactorily by calendering. It is the usual practice, therefore, to manufacture soles of this type by molding, the common practice being substantially like that followed in the manufacture of rubber heels. That is, the stock is compounded, sheeted, and blanks of suitable shape are died out of the sheeted material. These blanks are then inserted in molds, the molds are placed in a press and subjected to a proper temperature and pressure for a length of time sufficient to give the soles at least a partial vulcanization or "cure". These soles thus are molded to their final shape and are cured more or less according to the use which is subsequently to be made of them. If the soles are to be used in rubber footwear which must be vulcanized, they are only partly cured in the molding operation, the cure or vulcanization being completed during the subsequent operation of vulcanizing the shoes.

It will be evident that this method is very expensive both in equipment and in time. Since the soles are at least partially cured, the molds should be designed to give them the required curvature to fit smoothly on the bottom of a shoe. The expense of making the molds therefore is affected not only by the design which is to be given to the tread face of the sole, but also by the fact that the upper surface of the sole must be curved. Consequently, the mold equipment necessary for producing the usual range of sizes is extremely expensive, and this equipment must be changed completely for every new style or design.

A further difficulty resulting from this process where such outsoles are to be used on vulcanized shoes, is the fact that the composition of the stock in the outsole and the vulcanizing of the sole must be controlled very accurately in order to be sure that the outsole will be properly vulcanized by the time the shoe is completed. That is, the sole is partly vulcanized in the process of molding it, and the vulcanization is completed during the vulcanizing of the shoe to which the sole is attached. While such control can be, and is maintained, it involves, nevertheless, careful and accurate attention and increases the manufacturing cost of the final product.

The present invention aims to devise a more economical method of manufacturing rubber outsoles of the general type above designated. It aims to devise a process which can be performed more rapidly and with less expensive equipment, while still producing entirely satisfactory results. The invention also provides a novel product.

The nature of the invention will be readily understood from the following description when read in connection with the accompanying drawings, and the novel features will be particularly pointed out in the appended claims.

In the drawings,

Fig. 5 is a perspective view showing the upper surface of an outsole blank preparatory to pressing;

Fig. 6 is a cross-sectional view on the line 6—6, Fig. 5;

Fig. 7 is a perspective view of the bottom of the blank shown in Fig. 5; and

Fig. 8 is a transverse cross-sectional view of a finished sole.

Figure 2:
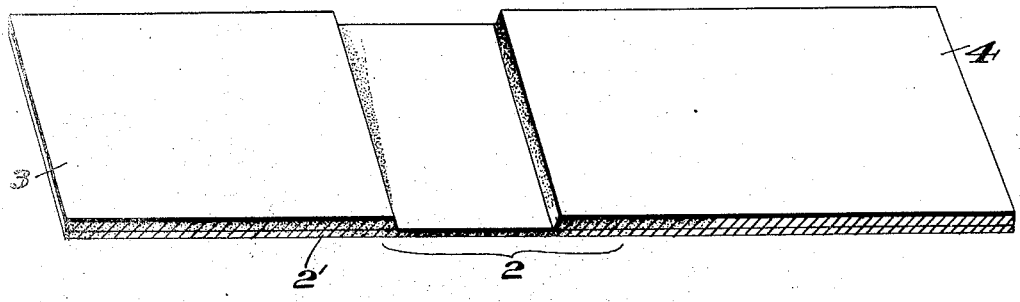
Fig. 2 is a perspective view of a piece of outsole stock prepared for the pressing operation.

The rubber stock from which the outsole is to be made may be prepared in any suitable manner, but according to the preferred process a sheet 2 of unvulcanized rubber is built up in plies, as shown in Fig. 2, this sheet comprising a lower ply 2' with plies 3 and 4 secured to the opposite margins thereof. The ply 3 is of a length at least equal to the maximum length of the heel portion of the sole to be cut therefrom, while the ply 4 is of a length at least as great as that of the maximum length of the forepart of the sole. Fig. 2 shows a section or piece of sheeted stock so prepared, this section being of suitable width for the making of an outsole.

Figure 1:
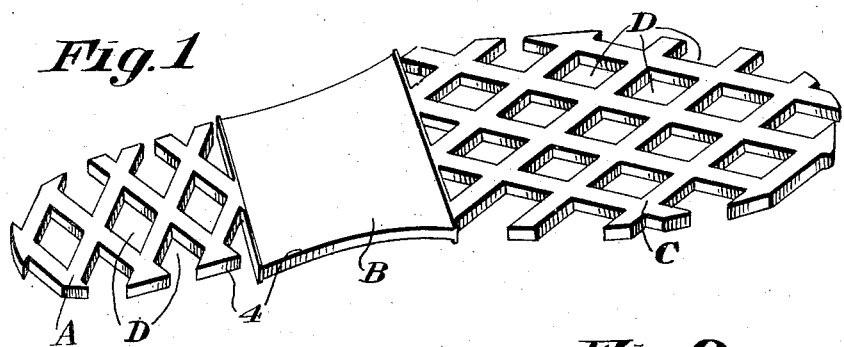
Figure 1 is a perspective view of a die of a general construction which preferably is used in the practice of this process.

The process devised by this invention may be most conveniently practiced with the aid of a molding die of a novel construction and shown in Fig. 1, it being understood, however, that this die construction is not essential to the successful practice of this process. It will be observed that the die 4 shown in Fig. 1 has the general outline of a whole sole including both a heel part A, shank B, and forepart C. The design has been made by cutting holes D entirely through the die from one face thereof to the other. In the present instance these holes are of diamond shape, but any other design could be substituted for it. The die may be made of brass, steel, or any other suitable metal.

Figure 3:
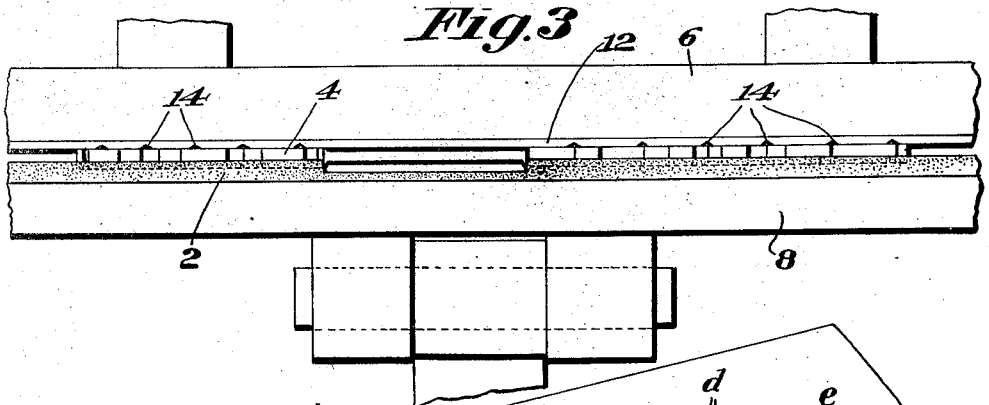
Fig. 3 is a side view showing a step in the pressing operation.

The process is facilitated by heating either the die or the piece of stock 2, or both. Usually it is more convenient simply to heat the die. This may be done by placing it for a few seconds in a highly heated oven or on an electrically heated plate, or in any other convenient manner. A high temperature is not necessary but it usually is preferable to heat the die to from 160° F. to 200° F., the temperature limits being very wide and being dependent to some degree on the nature of the rubber stock operated upon. This die, while still hot, is next pressed into the surface of the section 2 of unvulcanized rubber stock. For this purpose any suitable press may be used. An ordinary form of press which may conveniently be used for this purpose has a fixed head or plate 6, Fig. 3, and a movable table or presser plate 8 which is moved up and down toward and from the stationary plate 6 by a toggle mechanism, or some other convenient power driven mechanism. The piece of stock 2 is placed on the plate 8 with the die 4 on it, and the plate 8 then carries the die up against the head 6, thus pressing the die 4 firmly into the upper surface of the part 2 of rubber. The press may be so constructed that a slight dwell occurs when the plates 6 and 8 are in their pressure relationship, or the plate 8 may begin to descend instantly upon arriving at the upper limit of its stroke. Either arrangement can be used satisfactorily in this process, but it is preferable from the standpoint of production not to maintain the pressure on the die and stock for any substantial length of time. A moderate degree of pressure only is required to force the hot die firmly into the rubber composition and make a deep impression in the stock, as clearly shown in Fig. 4.

If the die were now removed from the stock and it was allowed to cool off slowly, it would gradually return or spring back toward its original condition and the greater part of the impression given to it by the die would be lost. I have found that this "rebound", or tendency of the stock to return to its original condition, can be prevented by chilling the rubber composition immediately after it has received its impression from the die. According to the preferred practice, therefore, the blank, with the die still embedded in it, is removed from the press as soon as the plate 8 is lowered and they are immersed in cold water at a temperature, say, of from 40° F. to 50° F. This chills the stock sufficiently to cause it to permanently retain the impression which has been given to it by the die. The blank may now be pulled out of the die, and the operations above described may be repeated with another blank.

Figure 4:
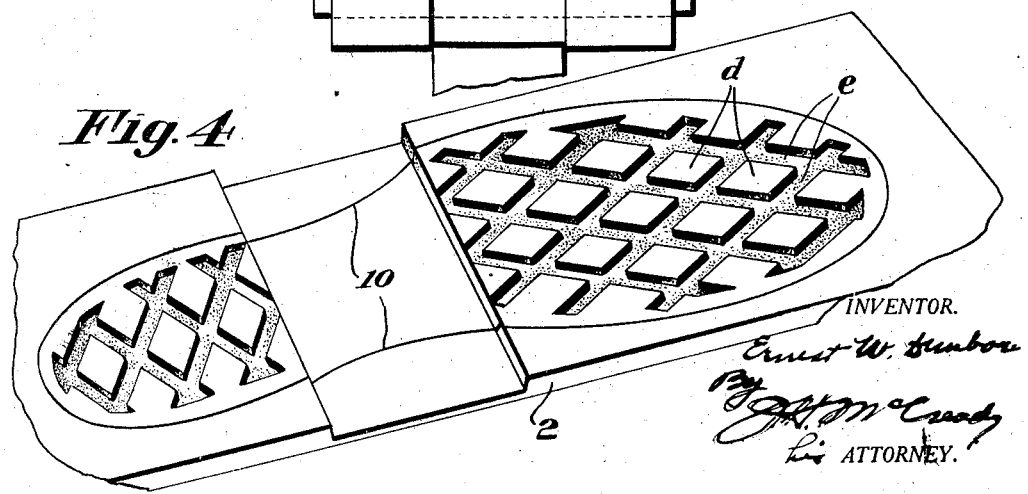
Fig. 4 is a perspective view showing the stock or blank after being impressed.

An outsole of the desired sole-shaped outline can then be cut out of the molded stock, as indicated at 10 in Fig. 4. This cutting operation can either be performed with a cutting die, with a knife, or more preferably, in a sole cutting machine of the type ordinarily used in this industry.

In case the lower surface of the upper pressure plate 6 is very true and flat, some trouble may be experienced with the trapping of the air in the cavities D of the die 4. This difficulty may be obviated by securing to the lower face of the plate 6 another plate 12 having a series of grooves 14 across its lower face. These grooves afford a vent for air trapped in the cavities D. If a thick die is used relatively little trouble is experienced from this trapping of the air since ample space is provided for the compression of the trapped air.

Instead of impressing the design in a very rough blank, such as that shown at 2, I find it usually preferable to prepare an outsole blank from the sheeted stock. Such a blank is shown at 16 in Figs. 5, 6 and 7. This blank is cut out of stock prepared in the same manner as that shown in Fig. 2, the cutting preferably being performed in a sole cutting machine of the type commonly used in this industry. Since the edges of the blank are unconfined during the operation of pressing the die into its surface and therefore may, with certain compositions, be distorted somewhat, I prefer to reinforce the blank with a binder strip 18, Figs. 5 and 6, which is cut to the outline of the sole but is somewhat smaller and is secured on the upper surface of the blank 16, as clearly shown in the drawings. This binder strip consists of a woven fabric heavily frictioned or coated with rubber. The steps in the production of the design in the tread face of this blank are performed exactly as above described, the final result being the same. Fig. 8 shows a finished outsole in transverse cross-section.

It will be noted that the design of outsole shown in Figs. 4 and 8 has relatively large projections *d* which are separated from each other by deep grooves *e*. The present process is of particular value in making a rubber outsole having deep grooves or prominent projections in its tread face. Designs of this character cannot be made satisfactorily in calendering, but, as above stated, have been made heretofore by molding. The present process greatly reduces the expense of manufacture of outsoles of this type because it requires relatively inexpensive molds or dies, less heat is used, it involves the expenditure of only a fraction of the time required for the molding process, and the labor expense is greatly reduced. Furthermore, in changing from one style of design to another, the scrapping of expensive equipment is avoided, and the expense for new dies is comparatively small. The process, therefore, lends itself readily to the manufacturing requirements in this industry. A die such as that shown in Fig. 1 is preferable both because the same die can be used for rights and lefts, and also because two or more size of soles can be made from the same die.

It should also be noted that since the sole is made from unvulcanized rubber stock the scrap stock left after the trimming operation or the cutting out of the sole blanks can all go back to the mill and be re-worked.

The outsoles made by this process may be used in the manufacture of footwear exactly as are molded soles. In the case of rubber shoes, such as basketball shoes and the like, the sole is assembled with the other parts of the shoe and the cure or vulcanization of the sole is effected simultaneously with the vulcanization of the entire shoe. Where the outsoles are to be stitched on the bottom of leather shoes, they are vulcanized before being incorporated in the shoes.

Essentially the same process may be used in the manufacture of other articles which have heretofore been made by molding and vulcanizing. Step mats for the running boards of automobiles may, for example, be made in this way at a substantial saving in the expense of manufacture. In performing the vulcanizing operation it is not necessary to use pressure since the stock has already been molded to the desired shape. While a more accurate shaping of the article might be produced by performing the vulcanizing operation with the blank in a mold or die, even if no pressure were used, still this ordinarily is not done, since the outsole or other article being manufactured loses so little in shape when vulcanized in a free condition, or out of the die or mold, that an entirely satisfactory article is produced.

While I have disclosed the preferred method of practicing my invention it will be understood that the process is susceptible of modification within the spirit and scope of the invention. For example, I have referred to the pressing of the die into the rubber stock but it is obvious that the stock could be pressed into the die or mold, the two operations being equivalents.

Having thus described my invention, what I desire to claim as new is:

1. That improvement in the process of making rubber articles, which consists in pressing a heated die into a piece of sheeted rubber stock, and then chilling the stock sufficiently to cause it to hold the impression which has been imparted thereto by the die.

2. That improvement in the process of making rubber articles, which consists in providing a suitable piece of sheeted rubber stock, heating the stock, forcing a die into the surface of the heated stock and thereby making a deep impression in said stock, and then chilling the stock.

3. That improvement in the process of making rubber outsoles, which consists in providing an unvulcanized rubber blank having a sole shaped outline, providing a die of suitable design, heating one of said parts, pressing said die into said blank while the heated part is still hot, and immediately thereafter chilling the blank so impressed.

4. That improvement in the process of making rubber outsoles, which consists in providing an outsole blank of unvulcanized rubber, providing a die of suitable design, heating one of said parts, pressing the die into the surface of the blank while the heated part is still hot, immediately releasing the pressure, and then chilling the blank and thereby causing it to retain the impression given to it by the die.

5. That improvement in the process of making rubber outsoles, which consists in providing an outsole blank of unvulcanized rubber, providing a die of suitable design, heating one of said parts, pressing the die into the surface of the blank while the heated part is still hot, immediately releasing the pressure, then chilling both the blank and the die, and subsequently separating the blank from the die.

6. That improvement in the process of making rubber outsoles, which consists in providing a blank of a suitable rubber composition, providing a die having deep cavities therein for imparting the desired design to the blank, heating said die, pressing the heated die into the surface of the blank, allowing the air trapped in said cavities to escape, chilling both the die and the blank before they are separated and thereby causing the blank to retain the impression given to it by the die, and then separating the blank from the die.

7. That improvement in the process of making rubber outsoles, which consists in providing a suitable blank of unvulcanized rubber, pressing a heated die into the surface of said blank, cooling both the blank and the die before separating them and thereby causing the blank to retain the impression given to it by the die, and then separating the blank from the die.

8. That improvement in the process of making rubber outsoles, which consists in providing a suitable blank of unvulcanized rubber, pressing a heated die into the surface of said blank while the blank is unconfined at its edges, maintaining the pressure on the blank for a very brief interval only, and cooling the blank immediately after the pressing operation sufficiently to cause it to retain the impression given to it by the die.

9. That improvement in the process of making rubber articles which consists in pressing a die into a piece of unvulcanized rubber stock while one of said parts is heated, then chilling the stock sufficiently to cause it to hold the shape imparted thereto by the die, and subsequently vulcanizing the stock so treated.

10. That improvement in the process of making rubber articles which consists in pressing a die into a piece of unvulcanized rubber stock while one of said parts is heated and thereby molding the stock, then chilling the stock sufficiently to cause it to hold the shape imparted thereto by the die, and subsequently vulcanizing, without pressure, the stock so molded.

11. That improvement in the process of making rubber articles which consists in providing an unvulcanized rubber blank of suitable shape, providing a die of suitable design, heating one of said parts, pressing said die into said blank while the heated part is still hot, immediately thereafter chilling the blank so impressed, separating the blank from the die, and subsequently vulcanizing the blank so treated.

12. That improvement in the process of making rubber articles which consists in pressing a die into a piece of unvulcanized rubber stock and thereby molding the stock, separating the stock from the die, chilling the stock sufficiently to cause it to hold substantially the shape imparted thereto by the die, and subsequently vulcanizing, without pressure, the stock so molded.

ERNEST W. DUNBAR.